United States Patent

[11] 3,602,844

[72] Inventor Roger A. Sykes
Bethlehem, Pa.
[21] Appl. No. 863,895
[22] Filed Oct. 6, 1969
[45] Patented Aug. 31, 1971
[73] Assignee Bell Telephone Laboratories, Incorporated
Murray Hill, N.J.

[54] CHANNEL SEPARATING ELECTRICAL WAVE FILTER
14 Claims, 14 Drawing Figs.

[52] U.S. Cl. 333/6, 310/9.8, 333/72
[51] Int. Cl. H01v 7/00, H03h 9/04, H03h 9/32
[50] Field of Search 333/72, 6; 310/9.7, 9.8, 8, 8.1, 8.3, 8.4, 8.5, 8.6, 8.7, 9

[56] References Cited

UNITED STATES PATENTS

| | | | |
|---|---|---|---|
| 3,283,264 | 11/1966 | Papadakis | 333/72 X |
| 3,444,482 | 5/1969 | Becker | 333/72 X |
| 3,448,437 | 6/1969 | Barnett | 310/9.8 X |
| 3,487,318 | 12/1969 | Herman | 333/72 X |
| 3,517,350 | 6/1970 | Beaver | 310/9.8 X |

*Primary Examiner*—Herman Karl Saalbach
*Assistant Examiner*—Marvin Nussbaum
*Attorneys*—R. J. Guenther and Edwin B. Cave

ABSTRACT: Multichannel signals on a single transmission path are separated into component channels by applying them to a pair of resonator-forming input electrodes mounted on a crystal wafer. Two or more groups of resonators, formed by other electrodes on the wafer, are each acoustically coupled to the input resonator but not to each other. The respective groups are tuned, by controlling the masses of the electrodes and the spacing between them, to form mutually exclusive passbands.

INVENTOR
R. A. SYKES
BY
ATTORNEY

CHANNEL SEPARATING ELECTRICAL WAVE FILTER

REFERENCE TO COPENDING APPLICATIONS

This application relates to the following copending applications, the subject matter of which are hereby incorporated as part of this application as if recited herein:

W. D. Beaver and R. A. Sykes, Ser. No. 541,549 filed Apr. 11, 1966 now abandoned;

W. D. Beaver and R. A. Sykes, Ser. No. 558,338 filed June 17, 1966;

R. L. Reynolds and R. A. Sykes, Ser. No. 723,676 filed Apr. 24, 1968; and

I. E. Fair and E. C. Thompson, Ser. No. 771,843 filed Oct. 30, 1968.

BACKGROUND OF THE INVENTION

This invention relates to crystal filters, particularly so-called channel bank filters for separating the individual frequency-multiplexed information channels being propagated together along a single transmission path at respective channel frequencies.

In the past, such channel bank filters were composed of complex filter circuits including many crystal structures and other circuit components. Assembly of such filters was complicated. The resulting filters were bulky, thereby requiring considerably space.

THE INVENTION

According to a feature of the invention, these deficiencies of channel-bank filters are overcome by applying incoming multichannel signals to a pair of electrodes that form an input resonator with a wafer that is acoustically resonant in a thickness shear mode, and by coupling the resonator's acoustical energy to a plurality of output systems each having resonators formed with other pairs of electrodes on the same wafer. The resonators of each system are tuned to respective resonant frequencies, and the coupling between resonators adjusted by spacing of the resonators, so as to form passbands mutually exclusive of the passbands formed at other output systems. Preferably, to achieve smooth passbands, the resonant frequencies of all the resonators are tuned sufficiently far from the characteristic frequency of the wafer and the resonators spaced sufficiently far apart so that the coupling coefficient between two coupled resonators is less than the effective electromechanical coupling limit of both resonators. This limit is a function of the resonator's capacitance ratio $r$. Preferably, the resonators are tuned by controlling their electrodes' masses.

According to another feature of the invention, the exclusivity of passbands is emphasized by forming each output system from an output resonator and one or more intermediate resonators between the input resonator and the output resonators.

According to another feature of the invention, the two output resonators exhibit independent resonant frequencies respectively higher and lower than the input resonator.

According to another feature of the invention, the input electrodes are formed at the center of the wafer and the output electrodes at peripherally spaced locations relative to the input electrodes. Preferably, the intermediate pairs of electrodes are aligned between the input and output electrodes like the spokes of a wheel.

These and other features of the invention are pointed out in the claims forming a part of this specification. Other objects and advantages of the invention will become known from the following detailed description of embodiments of the invention when read in light of the accompanying drawings.

DESCRIPTION OF PREFERRED EMBODIMENT

Figure 1:
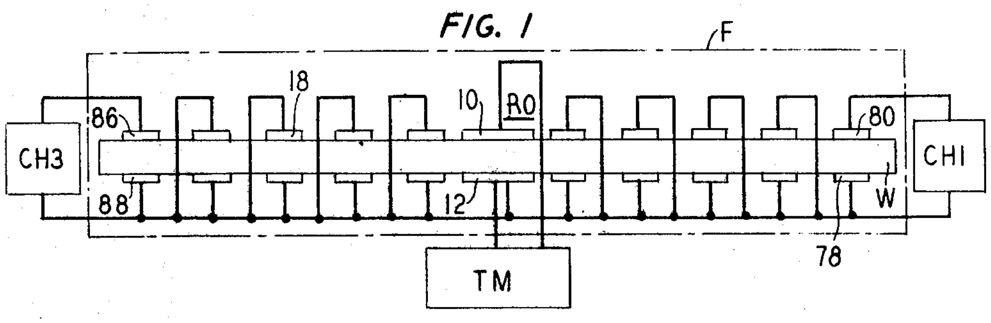
FIG. 1 is a schematic diagram partly in section of a channel filter embodying features of the invention.
Figure 2:
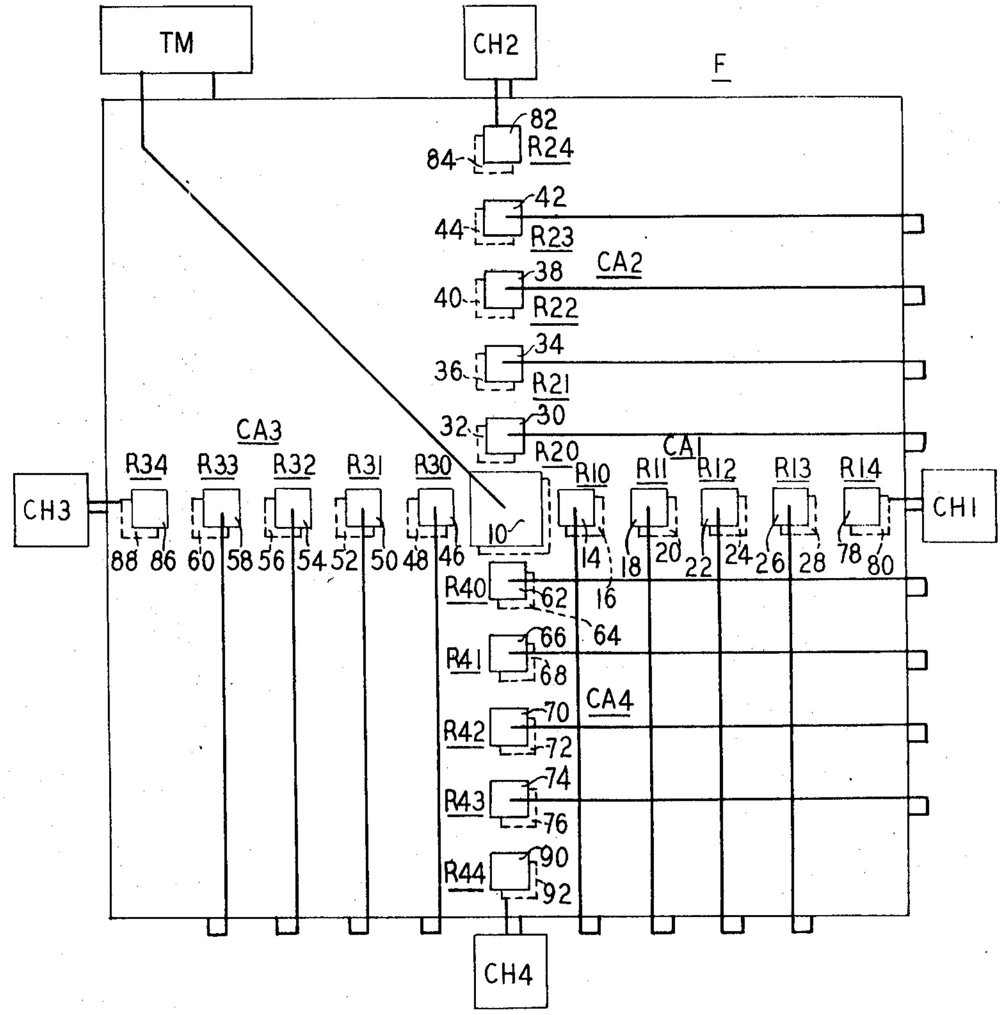
FIG. 2 is a circuit diagram of the channel filter in FIG. 1, showing a plan view of the sectioned portion in FIG. 1.
Figure 3:
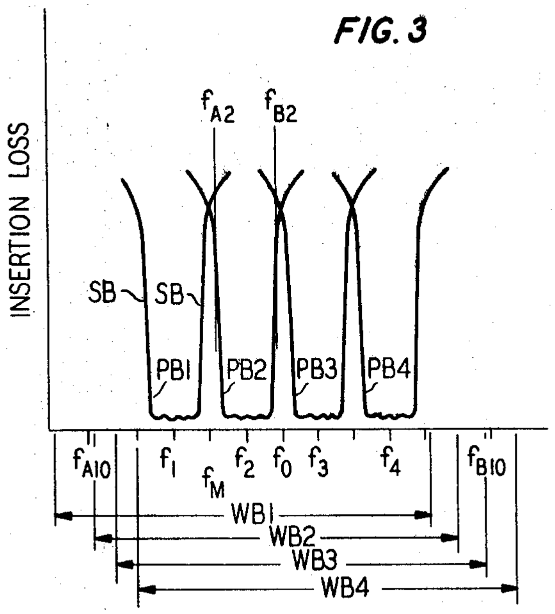
FIG. 3 is a graph illustrating the passbands formed by the respective channels of the filter in FIGS. 1 and 2 and showing significant frequencies in its operation.

In FIGS. 1 and 2 a channel filter F according to the invention receives a broad band of incoming electrical multichannel signals from a multichannel transmission medium TM. These incoming signals, shown in FIG. 3, are distributed over several passbands PB1, PB2, PB3 and PB4. The filter F separates the passbands PB1, PB2, PB3 and PB4 from each other and applies the signals of each passband to one of four separate channel transmission media CH1, CH2, CH3 and CH4.

The filter F receives the multichannel input signals at a pair of opposing input electrodes 10 and 12 vapor deposited in the centers of opposite faces on an acoustically resonant wafer W. The electrodes and the portion of the wafer between them form a resonator $R_0$. According to an embodiment of the invention, the wafer W is an AT-cut of quartz crystal. According to other embodiments, it is made of lithium tantalate, lithium niobate, polarized ceramic, or other piezoelectric materials.

The incoming electrical signals at the electrodes 10 and 12 excite thickness shear vibrations in the wafer W. The resulting vibratory energy is propagated through the wafer W along four chains CA1, CA2, CA3, and CA4 of intermediate electrodes 14 through 28, 30 through 44, 46 through 60, and 62 through 76 to four pairs of output electrodes 78 and 80, 82 and 84, 86 and 88, and 90 and 92. The intermediate and output electrodes form, with the wafer W, respective resonators $R_{10}$ to $R_{14}$, $R_{10}$ to $R_{24}$, $R_{30}$ to $R_{34}$, and $R_{40}$ to $R_{44}$. The intermediate electrodes are arranged in short-circuited pairs on opposite faces of the wafer W. The vibratory acoustical energy appearing at the output electrodes 78 and 80, 82 and 84, 86 and 88, and 90 and 92 then generates separate electrical signals in the pairs of output electrodes. These output signals are applied to the individual channel transmission media CH1, CH2, CH3 and CH4.

The resonators $R_{10}$ to $R_{13}$, $R_{20}$ to $R_{23}$, $R_{30}$ to $R_{33}$, and $R_{10}$ to $R_{43}$ in each chain CA1, CA2, CA3 and CA4 are tuned and coupled to each other and to the resonators $R_{14}$, $R_{24}$, $R_{34}$, and $R_{44}$ formed by the corresponding output electrodes so as to define separate passbands. At the media CH1, CH2, CH3, and CH4 these passbands correspond to respective bands PB1, PB2, PB3, and PB4. The media have characteristic resistances to match the characteristic resistances of the resonator substances over the respective desired passbands. When the wafer is made of quartz the media CH1, CH2, CH3, and CH4 have characteristic resistances such as 75 ohms. When the wafer 0 is lithium tantalate this resistance is in the range of 5 ohms.

In the drawings, the intermediate pairs of electrodes 14 through 28, and 46 through 60 are aligned along the X crystallographic axis and the pairs of electrodes 30 through 44, and 62 through 76 along the Z' crystallographic axis. Also, in the drawings, the thicknesses of the wafer W and the electrodes are exaggerated for clarity. For the same reason, electrodes such as 82, 36, 64, 68 and 92, etc. appear in FIG. 2 as slightly offset, although it is understood that they are opposite the electrodes above them. The offset merely furnishes an opportunity to illustrate these electrodes in FIG. 2.

The term "thickness shear mode" is used in the general sense set forth in the McGraw-Hill Encyclopedia of Science and Technology, 1966 edition, volume 10, page 221. This use of the term is generic to what has sometimes been divided into a "thickness shear mode" and a "thickness twist mode." Vibrations in the more specific "thickness shear mode" are prominent when electrodes are aligned in the X crystallographic axis of an AT-cut quartz crystal wafer. Vibrations in the sometimes called "thickness twist mode" are prominent when electrodes are aligned along the Z' axis. In the beforementioned McGraw-Hill Encyclopedia, these two specific "-modes" are distinguished from each other with such designations as the thickness shear mode wherein $m=1$, $n=1$, $p=1$, and the thickness shear mode wherein $m=1$, $n=1$ and $p=2$.

The operation of the filter F depends upon the tuning of the respective resonators that the electrode pairs form with the wafer W, and upon the coupling between the resonators. Tuning is determined by the masses and dimensions of the electrodes and the thickness of wafer W. The resonator $R_0$ formed by the electrodes 10 and 12 and the portion of the wafer W between them exhibits a natural self-resonant frequency $f_0$. The term self-resonant frequency denotes herein that resonant frequency which two electrodes and the wafer between them exhibit when they are alone or effectively decoupled from all other resonators. The frequency $f_0$ depends upon the masses and dimensions of the electrodes 10 and 12 and the thickness of the wafer W. Because of the electrode masses, the frequency $f_0$ is lower than the fundamental thickness shear frequency $f_f$ of the unelectroded wafer W. This shift is called plateback $P_L$ and defined as $(f_f-f_0)/f_f$.

It is the fraction of the shift in self-resonant frequency from the fundamental thickness shear frequency $f_f$ of the unelectroded wafer W. In quartz, this plateback may be anywhere between 0.3 percent to 3.5 percent. A suitable value for plateback is about 1.5 percent. In FIG. 1, the frequency $f_0$ is made equal to the midband frequency $f_m$ of the multichannel signals shown in FIG. 3. The frequency $f_f$ is also referred to as the characteristic frequency of the wafer.

An effect of shifting or plating-back the frequency is to concentrate the thickness shear vibrations of the resonator formed by the electrodes and the portion of the wafer, in the vicinity of the wafer between the electrodes. These vibrations decay exponentially as they recede from the resonator. Thus, the further away one resonator is from another, that is the further away the plated-back electrode pair of one resonator is away from the plated-back electrode pair of another resonator, the more loosely coupled are the resonators. The greater the plateback, the less the coupling between two resonators whose electrode pairs are spaced a particular distance apart. The electrodes are all spaced far enough from the wafer edges so that the effect of the wafer edges on the vibrations of any of the resonators is substantially negligible.

In the absence of other resonators, each of the resonators $R_{10}$, $R_{11}$, $R_{12}$, $R_{13}$, and $R_{14}$ formed by respective pairs of electrodes 14 through 28, 78 and 80, and the wafer portions between each pair tunes to an uncoupled self-resonant frequency $f_1$. This is the midband frequency in the passband PB1. The resonators $R_{20}$, $R_{21}$, $R_{22}$, $R_{23}$, and $R_{24}$ formed in part by electrodes 30 through 44, 82 and 84 each tunes to a self-resonant frequency $f_2$. This is the midband of passband PB2. The resonators $R_{30}$, $R_{31}$, $R_{32}$, $R_{33}$, and $R_{34}$ formed by the electrodes and the wafer portions between electrodes 46 through 60, 86 and 88 and tune to self-resonant frequencies $f_3$, the midband frequency of passband PB3. The electrodes 62 through 76, 90 and 92 which in part form respective resonators $R_{40}$, $R_{41}$, $R_{42}$, $R_{43}$, and $R_{44}$ are such as to tune each of the resonators to self-resonant frequencies $f_4$, the midband of passband PB4.

The coupling between resonators is a function of the spacing between resonators in view of the masses of their electrodes. In FIGS. 1 and 2, the electrodes 14 and 16, 30 and 32, 46 and 48, and 62 and 64 are sufficiently close to the electrodes 10 and 12, so that the resonator $R_0$ formed by the electrodes 10 and 12 excites the wafer portions between these electrodes into thickness shear vibrations and thus couples the input resonator $R_0$ to these four resonators $R_{10}$, $R_{20}$, $R_{30}$, and $R_{40}$. However, the electrodes of the four resonators $R_{10}$, $R_{20}$, $R_{30}$ and $R_{40}$ surrounding the input electrodes 10 and 12 are far enough apart from each other and sufficiently mass loaded, or plated-back, so these resonators remain uncoupled from each other. The coupling between the input resonator $R_0$ and the respective resonators $R_{10}$, $R_{20}$, $R_{30}$ and $R_{40}$ causes energy to pass between these electrodes over wide frequency bands WB1, WB2, WB3, and WB4 whose widths depends upon the coupling between the resonators $R_0$ and $R_{10}$, $R_0$ and $R_{20}$, $R_0$ and $R_{30}$, and $R_0$ and $R_{40}$. These bands all embrace the bands PB1, PB2, PB3, and PB4 of FIG. 3. The coupling between any two resonators increases with decreasing distance between electrode pairs and decreasing plateback. The tighter the coupling, the wider the band over which energy is transmitted.

The pairs of electrodes 14 and 16 through 78 and 80, in view of their electrode masses, are spaced sufficiently far from each other so that each resonator $R_{10}$, $R_{11}$, $R_{12}$, $R_{13}$ and $R_{14}$ formed thereby, and tuned to the frequency $f_1$, is coupled to each adjacent resonator loosely enough to form the passband PB1 out of the wider band WB1. This results in the overall passband PB1 appearing at the channel transmission medium CH1.

Similarly, the electrodes 30 and 32 through 42 and 44, and 82 and 84 are spaced sufficiently far from each other so that each resonator is coupled to the adjacent resonator loosely enough to form the band PB2. This furnishes an output along the passband PB2 of FIG. 3 across the low characteristic-resistance medium CH2.

The resonators of electrode pairs 46 and 48 through 58 and 60, and 86 and 88, tuned to frequency $f_3$, are also spaced sufficiently far from each other so that each pair is coupled to the adjacent pair loosely enough to form the band PB3. This furnishes an output along the passband PB3 of FIG. 3 across the low characteristic-resistance medium CH3.

The pairs of electrode 62 and 64, through 74 and 76, and 90 and 92, which tune the wafer portion between them to frequency $f_4$, are also spaced sufficiently far from each other to reduce the coupling between themselves. The spacing is such so as to form the band PB4. This furnishes an output along passband PB4 of FIG. 3 across the low characteristic-resistance medium CH4.

The resonators $R_{10}$ through $R_{14}$ form a group. Similarly, the resonators $R_{10}$ through $R_{24}$, $R_{30}$ through $R_{34}$, and $R_{40}$ through $R_{44}$ form three other groups. The electrode pairs of each group, in view of their electrode masses, are spaced far enough from the electrode pairs of other groups and from the wafer edges so that the resonators of each group are substantially decoupled from the resonators of other groups and from the wafer edges. The resonators within each group are coupled to each other as described.

The actual coefficients of coupling K between any two coupled adjacent resonators in a group are selected to achieve a desired Chebyscheff, Butterworth, or other passband with particular sidebands and in-band distortion. Each coupling coefficient K between two coupled resonators has the general value $K=(f_B-f_A)/f_A=(f_B-f_A)/f_B$ Here, $f_B$ and $f_A$ are short-circuit resonant frequencies observed when two resonators such as the resonators $R_{12}$ and $R_{13}$ are coupled to each other and isolated from other resonators. These values of $f_A$ and $f_B$ may vary in each chain to achieve a specific passband characteristic. However, they are close to and may be said to define, the passbands formed by the coupled resonators. They are usually close to the sidebands of the overall passbands. Thus, for resonators $R_{10}$, $R_{11}$, $R_{12}$, $R_{13}$ and $R_{14}$ they are close to the sidebands of the passband PB1.

Figure 4:
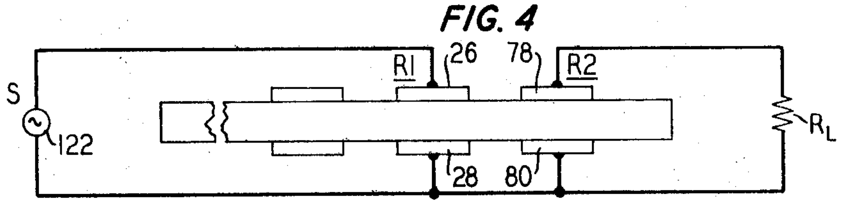
FIG. 4 is a schematic diagram illustrating a subsystem of the filter of FIGS. 1 and 2 with other connections for the purpose of illustrating the operation of the filter.
Figure 5:
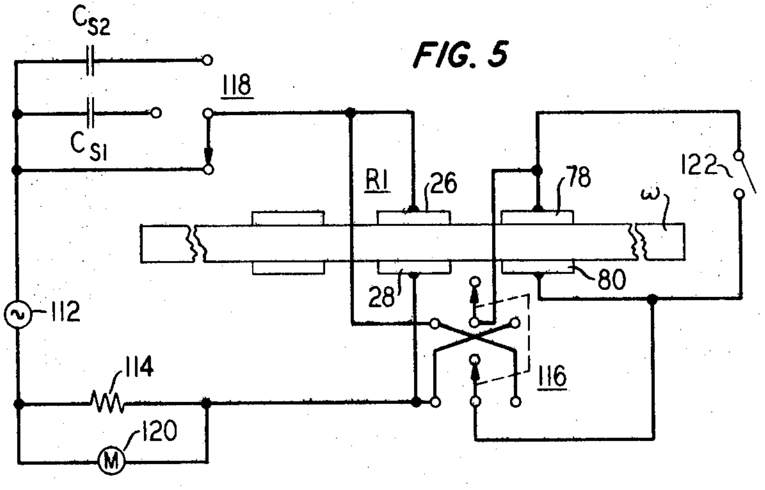
FIG. 5 is a schematic diagram including a portion of the filter in FIGS. 1 and 2 illustrating an apparatus for measuring the characteristics of the filter.

The value $K$ for any two resonators may be determined from the circuitry of FIG. 5. Here, a source 112 applies a voltage across two of the resonators $R_1$ and $R_2$ whose coupling is to be established through a resistor 114 and a double-pole triple-throw switch 116. The switch 116 is shown in its center position. When thrown to one side, it connects the two resonators in parallel switching it to the other side cross-connects the resonators, but keeps them in parallel connection. A multiposition switch 118 is closed as shown to complete the circuit. The remaining electrodes on the resonators whose coupling is not being measured are detuned either by keeping them open-circuited or by suitable shunt capacitors or inductors. As the frequency of the source 112 varies, a meter 120 measures to determine the frequency at which the voltage across resistor 114 is maximum and then the frequency to which the voltage is minimum. The frequency the maximum voltage is the resonant frequency $f_A$ and the frequency at the minimum voltage is the coupled antiresonant frequency $f_{aA}$. When the switch 116 is crossed in the other direction to cross connect the electrodes of the still parallel connected resonators, the frequency again is varied at the source 112. The frequency at which maximum voltage is achieved is the resonant frequency $f_B$ and the frequency at which minimum voltage is achieved is the coupled antiresonant frequency $f_{aB}$. The frequencies $f_A$ and $f_B$ may also be found by setting the switch 116 to its center position, the switch 118 to the closed lower position, and by closing a switch 122. This corresponds to setting $R_L$ to 0 in FIG. 4. Frequencies at which the voltages across meter 120 are maximum are the frequencies $f_A$ and $f_B$. Since they occur when $R_L$ in FIG. 4 is 0, they are called short-circuit coupled resonant frequencies.

The circuit of FIG. 5 is also useful for determining the self-resonant frequency $f_X$ (e.g., $f_1, f_2, f_3$ and $f_4$) of any one resonator. This is accomplished by placing the switch 116 in a neutral position, closing the switch 118, and determining the frequency at which the voltage in the meter is a maximum. This frequency is the self-resonant frequency $f_X$. The frequency to which the voltage is a minimum is the isolated antiresonant frequency $f_{aX}$ corresponding to the self-resonant frequency of that resonator.

To achieve smooth passbands PB1, PB2, PB3 and PB4 at the media CH1, CH2, CH3 and CH4 it is essential that any two adjacent coupled resonators, when isolated from others, have a coupling coefficient $K$ less than the electromechanical coupling limit $E_C$ of each resonator. Thus $K<E_C$. Preferably $K<E_C/2$. This electromechanical coupling limit $E_C$ is a function of the piezoelectric characteristics of the wafer, the sizes of the electrodes, and circuitry to which the electrodes are connected. The value $E_C$ may be determined on the basis of any one of several similar criteria using the measured values of FIG. 5. In the simplest case where two resonators are coupled to each other and $K<E_C$, $E_C$ can be expressed in the following manner:

$$E_C\sim\frac{f_{aB}-f_B}{f_B}\sim\frac{f_{aA}-f_A}{f_A}\sim\frac{f_{aX}-f_X}{f_X}\sim\frac{1}{2r}\sim\frac{C_1}{2C_0}$$

Each of these approximate equivalents represents an acceptable criterion for determining the limit $E_C$. The value $r$ is the so-called capacitance ratio commonly used to characterize a single resonator. Its approximate equivalence to the value $(f_{aX}-_X)/f_X$ is pointed out in Standard Definitions and Methods of Measurements for Piezoelectric Vibrators, published by the Institute of Electrical and Electronic Engineers, Inc. of New York, N.Y., IEEE, No. 177, May 1966.

In the above equivalents for $E_C$, the coupling limit $E_C$ is defined on the first line, in terms that consider both coupled resonators together. In the second line each coupled resonator is considered alone. Where each coupled resonator is considered alone, and the two measured limit valued are different, $E_C$ is defined as the lower of the two values.

In the above relationships, $C_0$ is the electrostatic capacitance of the electrodes in each coupled resonator. The value $C_1$ is the equivalent motional capacitance of that resonator. The capacitance ratio $r$ is $C_0/C_1$.

The equivalent motional capacitance $C_1$ may be established with the circuit of FIG. 5 by moving the switch 116 to the neutral position, opening the switch 122, and shifting the armature of switch 118 to the closed circuit position. The self-resonant frequency $f_X$ is then measured by noting the frequency when the meter reads maximum. The measuring process continues by shifting the armature of switch 118 to the capacitor $C_{S1}$ and reading the resonant frequency $f_{S1}$ when the meter 120 reads a maximum. The same is done to obtain the resonant frequency $f_{S2}$ by including the capacitor $C_{S2}$ with the switch 118. The equivalent motional inductance $$L_X=\frac{1}{8\pi^2}\frac{1}{C_{S2}-C_{S1}}\frac{1}{f_{S2}-f_X}-\frac{1}{f_{S1}-f_X}$$

Then $$C_1=\frac{1}{4\pi^2 f_X^2 L_1}$$

Figure 6:
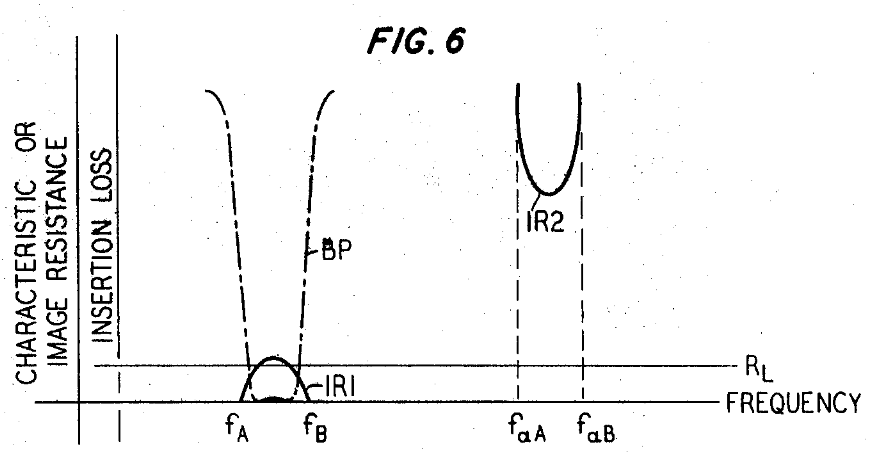
FIG. 6 is a graph illustrating in solid lines the characteristic or image resistance of a filter subsystem as shown in FIG. 4 when the coupling is low enough to be within the electromechanical coupling limit, and illustrating, in dot-dash lines, the passband formed when the subsystem is terminated by suitable low impedance.
Figure 7:
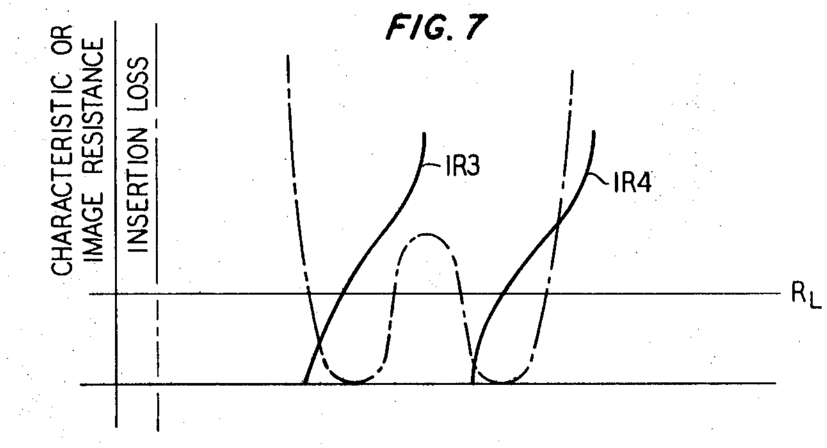
FIG. 7 is a diagram illustrating, in solid line, the characteristic or image resistance with frequency when the resonators of FIG. 4 are coupled more than the electromechanical coupling limit and illustrating, in dot-dash lines, the corresponding passband resulting from terminating the subsystem of FIG. 4 with a resistance.

The passband generated when a voltage is applied from the source 122 of FIG. 4 across a resonator $R_1$ and detected across the resonator $R_L$ is such as $B_P$ shown in FIG. 6 in dot-dash lines. If $K$ is not less than $E_C$ for both resonators, the passband appears as shown in dot-dash lines FIG. 7. The solid curves IR1 and IR2 in FIG. 6 and IR3 and IR4 in FIG. 7 illustrate the characteristic or image resistances exhibited by the coupled system of FIG. 4 for the two conditions. One where $K<E_C$, preferably $<E_C/2$, for both resonators. The solid curves IR3 and IR4 in FIG. 7 illustrate the characteristic or image resistances exhibited by the coupled system when $K$ is greater than $E_C$.

When $K<E_C$, a terminating impedance such as $R_L$ no matter what its value, matches both image resistance curves IR3 and IR4 at some point and energy is transferred over two frequency bands established by both IR3 and IR4 curves. However, when $K<E_C$ resistance $R_L$ intersects only one curve IR1. This causes maximum energy transfer only within the frequency range $f_B-f_A$. The mismatch to the other curve is sufficiently great to suppress energy transfer in that frequency range. Thus, a narrow, well-defined passband is established.

The $K<E_C$ or preferably $K<E_C/2$ can thus also be determined by the change of an image or characteristic resistance with frequency. If the changes follow the shape of the solid curves IR1 and IR2 in FIG. 6, $K<E_C$.

Figure 10:
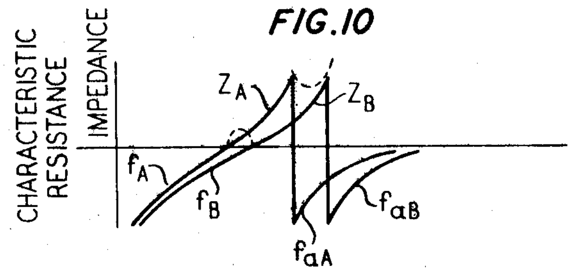
FIG. 10 is an impedance-frequency graph of the series and lattice impedances in FIG. 9, and the resulting changes in characteristic resistance when the resonators of FIG. 4 are coupled less than the electromechanical coupling limit.
Figure 8:
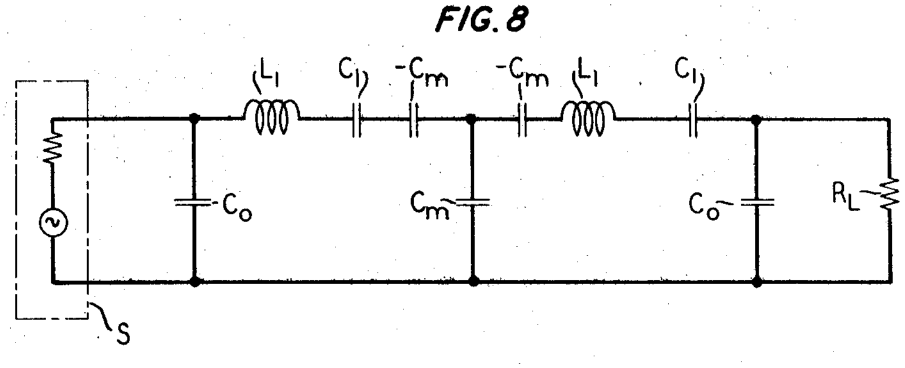
FIG. 8 is a schematic diagram illustrating the ladder equivalent circuit for the subsystem in FIG. 4.
Figure 9:
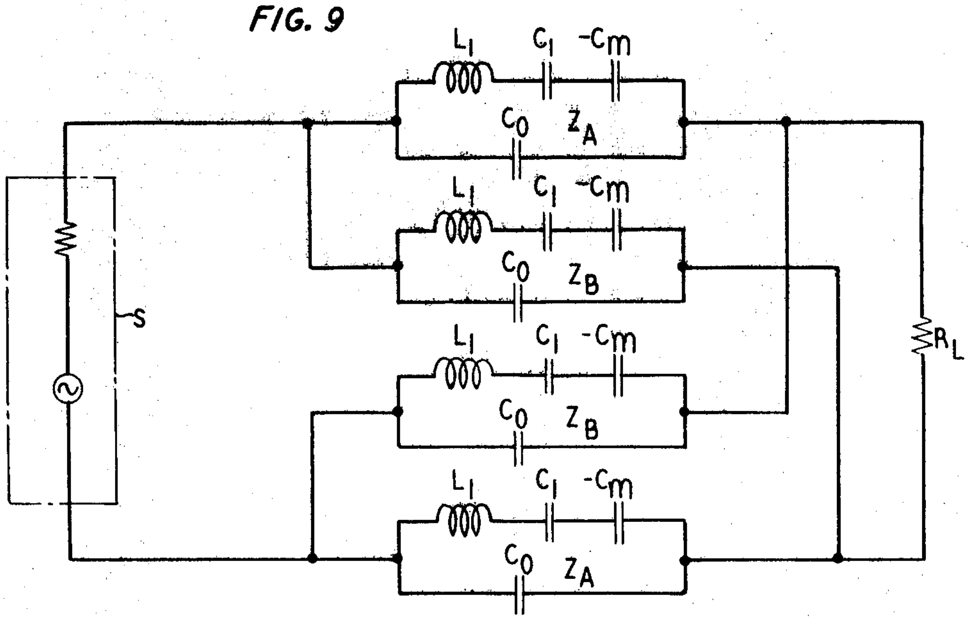
FIG. 9 is a schematic diagram illustrating the lattice equivalent circuit of the subsystem in FIG. 4.
Figure 11:
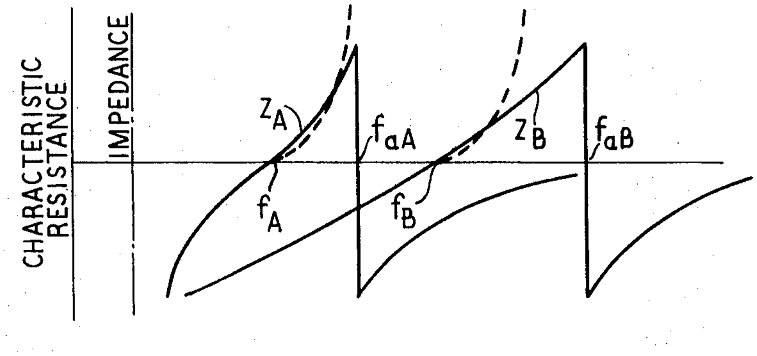
FIG. 11 is an impedance-frequency graph of the series and lattice impedances in FIG. 9 and the resulting changes in characteristic resistance when the resonators of FIG. 4 are coupled more tightly than the electromechanical coupling limit.

The development of the curves in FIGS. 6 and 7 can be best understood by considering FIGS. 8 and 9. FIG. 8 represents a ladder equivalent circuit of the two resonators shown in FIG. 4. The capacitance $C_1$ represents the equivalent motional capacitance in each resonator, the inductance $L_1$ represents the equivalent motional inductance, the capacitance $C_0$ represents the equivalent static capacitance of each resonator, and the capacitance $C_m$ and $-C_m$ represent the coupling between resonators. The lattice equivalent circuit appears in FIG. 9. FIGS. 10 and 11 represent respectively the impedances of the respective line and lattice arms of the lattice equivalent circuit when $K<E_C/2$, and when $K>E_C$. The characteristic or image impedance of the circuit represented by each of these figures is $\sqrt{Z_A Z_B}$. The real portions of these characteristic impedances, that is, the characteristic or image resistances, are shown in dotted lines and correspond to the solid lines of FIGS. 6 and 7.

Making the coupling coefficients K between adjacent resonators, such as $R_0$ and $R_1$, $R_1$ and $R_2$, $R_2$ and $R_3$, and $R_3$ and $R_4$, smaller than $E_C$ and preferably smaller than $\frac{1}{2}E_C$ allows each overall passband PB1, PB2, PB3, and PB4 to be smooth and continuous, and to conform to desired characteristics as shown in FIG. 6. It avoids separations of discontinuities such as exists in the passband curve of FIG. 7. These couplings furnish each overall filter system, such as the system from resonators $R_0$ to $R_{14}$, with an overall characteristic or image resistance which starts at zero, rises to a small finite maximum and returns to zero, similar to the image resistance CR1 in FIG. 6. Such a characteristic is necessary for obtaining the desired smooth passbands. It is indicative of the desired couplings. While it is possible to operate with coupling coefficients greater than $E_C$ at one or two of the resonators, this has the effect of causing the passband to depart from its desired shape, either in-band, or in the sidebands.

It is possible to increase the electromechanical coupling limit $E_C$ beyond the values such as $1/2r$ previously shown and thereby increase the permissible coupling coefficients and still obtain desired smooth passbands. This is done with additional electrical features or elements which the value $E_C$ is defined to embrace. At the intermediate electrodes 14 through 28, 30 through 44, 46 through 60, 62 through 76, this increase in $E_C$ is achieved by short-circuiting each pair of electrodes. The value of $E_C$ is then very high. It permits the coupling coefficients between short-circuited pairs to be as high as they can practically be made by spacing the electrodes as close as possible together and reducing plateback. However, generally the values of $K$ are kept within the range established by the shapes of the desired passbands. The short-circuits also effectively reduce stray electric effects.

Figure 12:
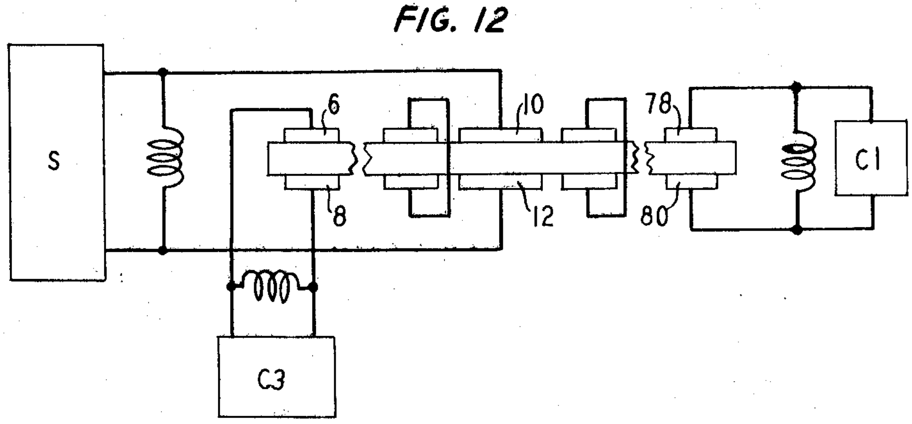
FIG. 12 is a sectional view of part of the filter in FIGS. 1 and 2 embodying further features of the invention.

The electrodes of the input resonator $R_0$ and the output resonators $R_{14}$, $R_{24}$, $R_{34}$, and $R_{44}$ cannot be short-circuited. However, even here the coupling limit $E_C$ may be increased. Thus, the allowable values of $K$ may be increased. To increase $E_C$ the electrostatic capacitances $C_0$ of resonators $R_{14}$, $R_{24}$, $R_{34}$, and $R_{44}$ are tuned with an inductor $L_0$ as shown in FIG. 12 to respective frequencies $f_1$, $f_2$, $f_3$, and $f_4$. The electromechanical coupling limit $E_C$ then equals $\frac{1}{\sqrt{r}}$.

Figure 13:
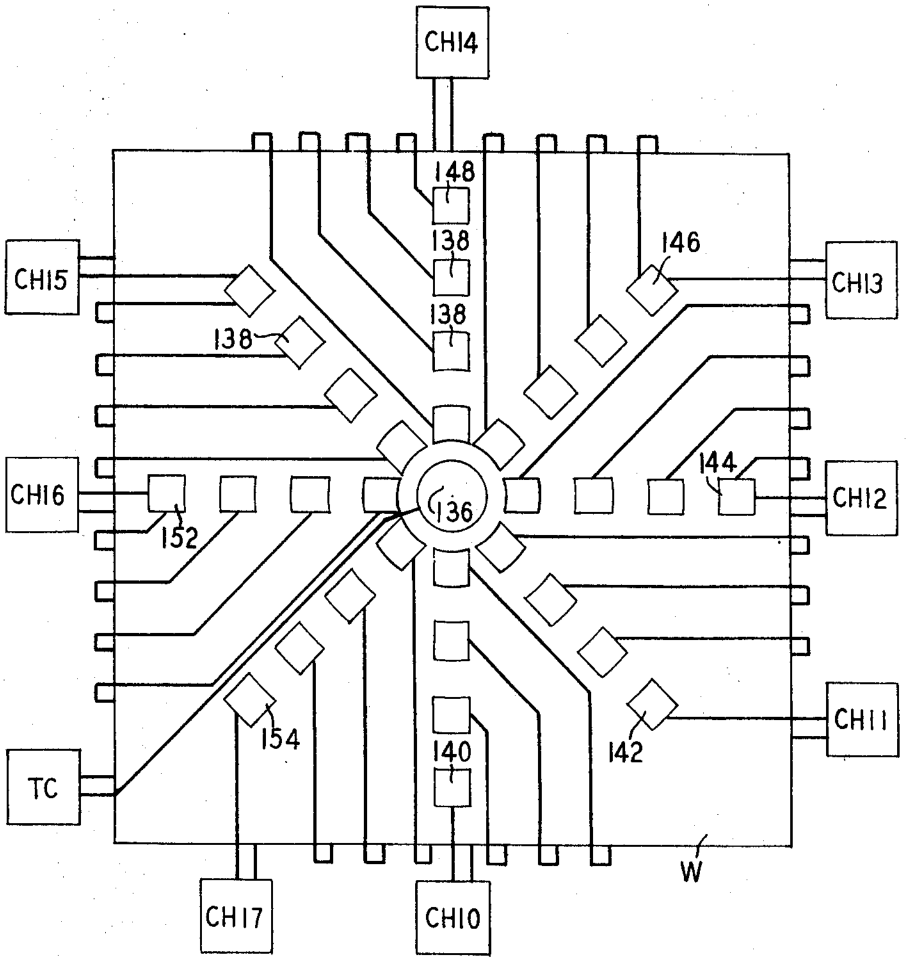
FIG. 13 is a plan view of a filter also embodying features of the invention.

According to another embodiment of the invention the axes along which the electrodes are aligned are rotated to axes between the Z' and X axes. Such a situation is illustrated more clearly in FIG. 13 wherein signals applied from a multichannel transmission medium TC to a pair of circular electrodes 36 at the center of a wafer W are piezoelectrically propagated in eight different directions by means of intermediate electrodes generally designated 138 to eight pairs of output electrodes 140, 142, 144, 146, 148, 150, 152 and 154. It will be understood that each of the electrodes appearing on the upper surface of the wafer W in FIG. 3 has a corresponding electrode on the bottom surface to form the pair. However, it is possible that a single electrode form the opposing electrode for all of the electrodes on the top face. Preferably, in FIG. 13 each of the intermediate electrodes 138 on the top face are short-circuited to their corresponding intermediate electrode on the bottom face and these all grounded to each other. In the embodiment illustrated in FIG. 13 the electrodes 140, 136 and 148 are aligned along the Z axis and the electrodes 152, 136 and 144 along the X axis. Signals appearing at the output electrodes 40 through 54 are applied to individual channels CH10, CH11, CH12, CH13, CH14, CH15, CH16 and CH17.

Figure 14:
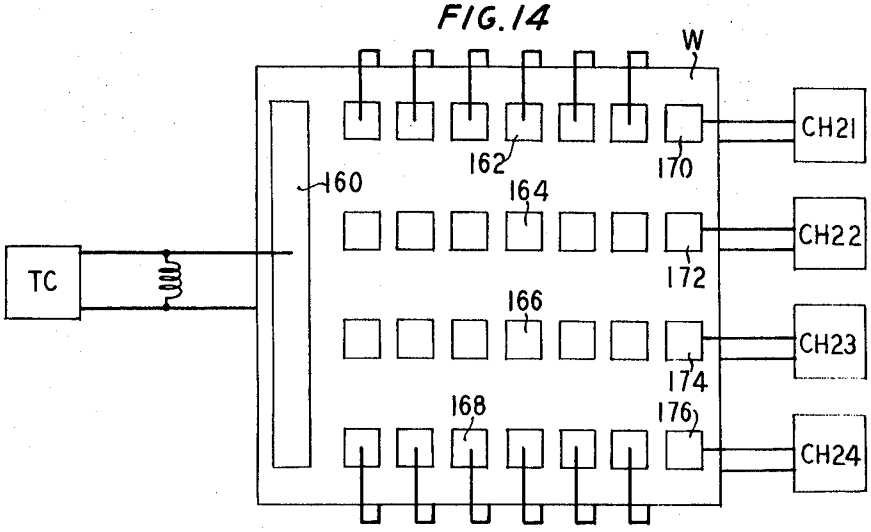
FIG. 14 is a plan view of still another filter embodying features of the invention.

The electrodes may also be arranged as shown in FIG. 14. Here the transmission channel TC applies signals to a pair of input electrodes 160. These input electrodes are elongated so as to establish vibrations along one end of a crystal wafer. The vibrations are propagated between wafer W along four parallel paths of intermediate electrodes 162, 164, 166 and 168 to establish at four pairs of output electrodes 170, 172, 174 and 176 four separate passbands lying within the broadband from the multichannel transmission medium. These electrical signals then appear in four suitable channels CH21, CH 22, CH23, CH24. In FIG. 4 only the intermediate electrodes 162 and 168 are short-circuited. They are tuned to the self-resonant frequencies $f_1$ and $f_4$. The intermediate electrodes 164 and 168 remain open-circuited. They are tuned so their uncoupled antiresonant frequencies are equal to the self-resonant frequencies $f_2$ and $f_3$.

While embodiments of the invention have been described in detail, it will be obvious to those skilled in the art that invention may be embodied otherwise within its spirit and scope.

What is claimed is:

1. A multichannel filter comprising an acoustically resonant wafer excitable in a thickness shear mode,
   - first electrode means mounted on said wafer and forming with said wafer, when said wafer is excited, first resonator means;
   - a first resonant system and a second resonant system each formed with portions of said wafer and each coupled through said wafer to said first resonator means;
   - said resonant systems being spaced sufficiently far from each other on said wafer so as to be substantially decoupled from each other;
   - said first resonant system when said wafer is excited forming a passband;
   - said second resonant system when said wafer is excited forming a second passband exclusive of said first passband.

2. A filter as in claim 1 wherein
   - said resonant systems each include a plurality of resonant means formed on said wafer and including said wafer material and exhibiting respective resonant frequencies;
   - said plurality of resonant means in said first resonant system being tuned and being spaced from one another to form said first passband;
   - said plurality of resonant means in said second resonant system being tuned and spaced from one another to form said second passband.

3. A filter as in claim 2 wherein
   - said resonant means and said resonator means each exhibit an electromechanical coupling limit;
   - said resonant means of each system being coupled acoustically to other resonant means of the same system with a coupling less than the electromechanical coupling limit;
   - one of said resonator means in each of said resonant systems each being coupled acoustically to said first resonator means, with a coupling less than the electromechanical coupling limit.

4. A filter as in claim 1, further comprising
   - conductive means for applying high frequency electrical signals to said first electrode means;
   - circuit means for connecting a resistive load to said first resonant system;
   - said wafer exhibiting a characteristic resonant frequency in a thickness shear mode;
   - said resonator means exhibiting when uncoupled a resonant frequency lower than the characteristic resonant frequency of said wafer.

5. A filter as in claim 2, further comprising
   - conductive means for applying high frequency electrical signals to said first electrode means;
   - circuit means for connecting a resistive load to said first resonant system;
   - said wafer exhibiting a characteristic resonant frequency in a thickness shear mode;
   - said resonator means exhibiting when uncoupled resonant frequencies lower than the characteristic resonant frequency of said wafer.

6. A filter as in claim 2 wherein said resonant means each include a pair of electrodes on opposite faces of said wafer.

7. A filter as in claim 6 further comprising electrical means for adjusting the electromechanical coupling limit of at least one of said resonant means in said resonant systems.

8. A filter as in claim 7 wherein said electrical means include short circuits connecting the electrodes of each pair.

9. A filter as in claim 7 wherein said first circuit means connect to said electrode means of one of said resonant means in said first resonant system, and said second circuit means connects to said electrode means of one of said resonant, means in said second resonant system;

said electrical means include an inductor.

10. A filter as in claim 1 wherein said first and second resonant systems include a plurality of resonators formed at least in part from said wafer and aligned in an elongated array;

additional resonant systems including a plurality of resonators formed at least in part from said wafer and aligned in elongated arrays.

11. A filter as in claim 10, wherein said arrays are aligned relative to said first resonator means like the spokes of a wheel.

12. A filter as in claim 10, wherein said arrays are aligned parallel to each other and wherein said first resonator means include a pair of elongated electrodes forming a resonator coupled to all resonant systems.

13. A filter as in claim 2, wherein said resonant means are coupled acoustically less than one-half the electromechanical coupling limit.

14. A filter as in claim 1, wherein said resonant systems are spaced far enough from each other on said wafer so as to be substantially decoupled from each other.